US006185434B1

(12) United States Patent
Hagström et al.

(10) Patent No.: US 6,185,434 B1
(45) Date of Patent: Feb. 6, 2001

(54) ANTENNA FILTERING ARRANGEMENT FOR A DUAL MODE RADIO COMMUNICATION DEVICE

(75) Inventors: Panu Hagström; Seppo Yrjölä, both of Oulu (FI)

(73) Assignee: LK-Products OY, Kempele (FI)

( * ) Notice: Under 35 U.S.C. 154(b), the term of this patent shall be extended for 0 days.

(21) Appl. No.: 08/927,642

(22) Filed: Sep. 11, 1997

(30) Foreign Application Priority Data

Sep. 11, 1996 (FI) ..................................................... 963577

(51) Int. Cl.[7] ............................ H04M 11/00; H04B 1/40

(52) U.S. Cl. ......................... 455/552; 455/132; 455/143; 455/168.1; 455/188.1; 455/553; 370/272; 370/275; 370/297; 370/339

(58) Field of Search ................................ 455/552, 188.1, 455/553, 132, 143, 168.1; 370/272, 275, 297, 339

(56) References Cited

U.S. PATENT DOCUMENTS

| | | | | |
|---|---|---|---|---|
| 4,091,344 | * | 5/1978 | LaTourrette | 333/134 |
| 4,168,479 | * | 9/1979 | Rubin | 333/126 |
| 5,239,279 | | 8/1993 | Turunen et al. | 333/134 |
| 5,239,697 | * | 8/1993 | Kosuga | 455/133 |
| 5,386,203 | | 1/1995 | Ishihara | 333/129 |
| 5,392,462 | * | 2/1995 | Komaki | 455/552 |
| 5,406,615 | * | 4/1995 | Miller, II et al. | 455/552 |
| 5,659,598 | * | 8/1997 | Byrne et al. | 455/436 |
| 5,691,676 | * | 11/1997 | Snel et al. | 333/204 |
| 5,884,188 | * | 3/1999 | Hayes, Jr. | 455/552 |

FOREIGN PATENT DOCUMENTS

| | | | |
|---|---|---|---|
| 0 631 400 A1 | 12/1994 | (EP) | H04B/7/26 |
| WO 95/23485 | 8/1995 | (WO) | H04Q/7/20 |
| WO 98/10483 | 3/1998 | (WO) | H01Q/1/24 |

* cited by examiner

*Primary Examiner*—Lee Nguyen
*Assistant Examiner*—Simon Nguyen
(74) *Attorney, Agent, or Firm*—Darby & Darby

(57) ABSTRACT

A dual mode radio apparatus has an integrated filtering part (51) which includes an antenna port (51*a*) for connection to an antenna (21), at least one port (51*b*, 51*c*, 51*d*) for connection to each of the system-specific radio-frequency parts (54, 55) of the dual mode radio apparatus and filtering means for directing the propagation of signals between ports on the basis of the signal frequency. The integrated filtering part replaces earlier separate filters and their impedance matching circuits as well as some of the required radio-frequency switches.

6 Claims, 10 Drawing Sheets

ANTENNA FILTERING ARRANGEMENT FOR A DUAL MODE RADIO COMMUNICATION DEVICE

The invention relates to the separation of transmission and reception generally in radio transceiver devices and particularly in dual mode devices which are designed for operation in multiple radio systems.

BACKGROUND OF THE INVENTION

The Global System for Mobile Telecommunications (GSM) is currently the most widely used one of the operational digital cellular networks. Because of network congestion it has been imperative to change the operating frequency of the GSM system from the original 900 MHz, approx., to 1.8 GHz. Cellular networks complying with other standards are also widely used around the world. With the mobility of people and communication between people increasing, there is a growing need for general-purpose phones that operate in different networks according to network availability and/or service prices. In dual mode radio telecommunications, the GSM and DECT (Digital European Cordless Telephone), for example, or other systems with significantly different specifications, can operate as pairs. In dual band radio telecommunications, the systems are very much alike (e.g. GSM and PCN, Personal Communication Network), but the operating frequency of the higher-frequency system is a multiple of the lower-frequency system. The dual mode capability is also taken into account in the so-called third generation cellular systems (Universal Mobile Telecommunication System, UMTS/Future Public Land Mobile Telecommunications System, FLPMTS).

A dual mode radio communication device has to accommodate the duplexing and multiple access methods of the different systems. Duplexing means separation of traffic in the transmit direction from the traffic in the receive direction in the communication between two transceiver devices. Common methods include time division duplexing, TDD, and frequency division duplexing, FDD. Multiple access means sharing the capacity of a system or its part (a base station, for instance) between several terminals (such as mobile phones, for example). Commonly used methods include time division multiple access, TDMA, frequency division multiple access, FDMA, and code division multiple access, CDMA. In addition, the systems employ various multiplexing methods in which one device directs the transmitted information from several sources to a common transmission channel, separating the signals by means of, say, time division multiplexing, TDM, or frequency division multiplexing, FDM.

A prior art radio apparatus using full time division or frequency division duplexing includes several RF and IF filters both on the transmitter side and on the receiver side. FIG. 1 shows a prior art GSM radio. In the GSM system, transmission and reception are carried out in different time slots and at different frequencies. The radio apparatus 100 includes on the receiver side a band-pass filter 12 the input port of which is connected to an antenna switch 14. The output port of the filter is connected to a low-noise amplifier (LNA) 17 which amplifies the received radio signal. It is followed by a second band-pass filter 18 which further filters the received signal. The output port of the filter 18 is connected to a mixer 11 in which the received signal is mixed with a first injection signal coming from a synthesizer 22. The mixing result, which is an intermediate-frequency signal IF, is taken via a filter 24 to a RF circuit in the receiver for further processing.

The transmitter part of the radio 100 includes a second local oscillator signal (LO) 26 which is produced by the transmitter pre-stage (not shown) and mixed in the mixer 30 with the first injection signal. The output of the mixer 30 is taken to a band-pass filter 13 which is normally found prior to the transmitter power amplifier 16. The output of the power amplifier 16 is connected to the input of a low-pass or band-pass filter 15 so as to further filter out undesired components in the signal before transmitting it via an antenna 21. In between the power amplifier 16 and the low-pass filter 15 there is often a directional coupler (not shown) which can be used for measuring the power level of the signal brought to the antenna.

FIG. 2 shows a DECT radio according to the prior art. A radio apparatus 200 includes a band-pass filter 19 the input port of which is connected to an antenna switch 14. The output port of the filter is connected to an antenna 21. One output port of the antenna switch is connected to a low-noise amplifier (LNA) 17 which amplifies the received radio signal. It is followed by a second band-pass filter 18 which further filters the received signal. The output port of the filter 18 is connected to a mixer 11 in which the received signal is mixed with a first injection signal coming from a synthesizer 22. The mixing result, which is an intermediate frequency signal IF, is taken to a RF circuit in the receiver for further processing.

The transmitter part of the radio 200 includes a mixer 30 in which the I/Q-modulated transmission signal is mixed with an injection signal. The output of the mixer 30 is taken to a band-pass filter 13 which is normally found prior to the transmitter power amplifier 16. The output of the power amplifier 16 is connected to a second output port of the antenna switch 14.

The antenna switch, which connects the antenna alternately to the transmitter and receiver branches, is used in a mobile phone to separate the signals if the transmission and reception frequencies are the same. If the transmission frequency band is different from the reception frequency band, the separating unit may be a filter similar to the duplex filter used in analog phones. The latter option can also be used in systems employing frequency division multiple access. FIG. 3 shows a prior art GSM radio 301 which differs from the radio 100 shown in FIG. 1 in that in this apparatus 301 the antenna switch (14), band-pass filter (12) and low-pass filter (15) are replaced by a duplex filter 20. The rest of the functions of these two radios are identical. A duplex filter is a three-port circuit element in which there is a receive branch filter between the antenna port and the receiver port, and a transmit branch filter between the transmitter port and the antenna port. The operating frequencies of the filters are such that a transmission-frequency signal cannot enter the receiver port and a reception-frequency signal cannot enter the transmission port. The frequency characteristics of the filters may be adjustable.

FIG. 4 shows a prior art dual mode GSM/DECT TDD radio 400 wherein both systems use a common antenna. In the radio according to FIG. 4 the antenna filtering arrangements in both systems are based on antenna switches and separate filters. An antenna switch 41 connects the common antenna either to the GSM or to the DECT system. When choosing the DECT system, the rest of the functions of the radio are, mainly the same as those shown in FIG. 2 and comprise a band-pass filter 19, a second antenna switch **14*b*, a receiver chain 17*b*-18*b*- 11*b*-24*b*** and a transmitter chain

13*b*-16*b*. When the GSM system is used the rest of the functions of the radio are mainly the same as those shown in FIG. 1 and comprise a receiver chain 12*a*-17*a* -18*a*-11*a*-24*a* and a transmitter chain 13*a*-16*a*-15*a* as well as a third antenna switch 14*a* which corresponds to the antenna switch 14 shown in FIG. 1. A switch 42 on the receive side and a switch 43 on the transmit side operate synchronously with the antenna switch 41, connecting the radio-frequency parts of either the DECT or the GSM system shown in FIG. 4 to the common modulation and demodulation parts of the dual mode phone and thence to other parts of the radio apparatus.

Even if a digital mobile phone using frequency duplex had an antenna switch to separate transmission and reception, it also must have filters since there has to be selectivity in the receiver input and it has to protect a low-noise preamplifier. Harmonic multiples of the output frequency and other spurious signals such as mirror frequencies have to be attenuated at the transmitter output. In addition, the filters eliminate noise generated on the receiver band by the transmitter chain. Also the frequencies below the transmission band have to be attenuated by a separate filter. In systems employing time duplex, such as DECT, or Digital European Cordless Telephone, it has to be made sure, in addition to the above, that spurious signals generated in the direction of the antenna by the receiver side during the transmission of the signal are sufficiently attenuated.

The standard impedance at interfaces between discrete components and filters is 50 ohms. Filter and semiconductor manufacturers match the input and output impedances of their products to the standard value in order to make modular design easier. In dual mode radio communications, the matching of a GSM duplex filter or transmission and reception filters, and, on the other hand, the matching of a DECT band-pass filter to a common antenna proves problematic. In prior art arrangements, impedance matching requires bulky and lossy separate components.

Thus, the prior art dual mode phone shown in FIG. 4 has to have as much as three separate antenna filters (reference designators 12, 19 and 15) and the matching circuits required by them. In addition, the construction includes all in all five radio-frequency switches. It is obvious that this kind of arrangement takes a lot of space on the printed circuit board of the radio apparatus and is expensive to manufacture. Furthermore, a high number of separate components increases losses and susceptibility of the circuit to electrical interference and to electrical or mechanical failure.

SUMMARY OF THE INVENTION

An object of the present invention is to provide a compact and low-loss antenna filtering construction for a dual mode radio communication device. Another object of the invention is that the antenna filtering construction according to the invention can be used in a digital cellular radio system based on time division multiple access. A further object of the invention is to raise the integration level of the radio communication device, thereby reducing the need for separate components. A yet further object of the invention is that the antenna filtering construction according to the invention is suitable for large-scale series production.

The objects of the invention are achieved by combining the separate two-port antennna filters of a dual mode radio communication device into one multi-port filter in which the matching circuits between different filtering parts are part of the filter structure.

The antenna filtering arrangement according to the invention is characterized in that it comprises an integral filtering part for connecting system-specific radio-frequency parts to an antenna, the integral filtering part comprising an antenna port for connection to the antenna, at least one port for connection to a first radio-frequency part, at least one port for connection to a second radio-frequency part, and filtering means to direct the propagation of signal between ports on the basis of signal frequency.

The invention is also directed to a radio communication device which uses the antenna filtering arrangement described above. The radio communication device according to the invention is characterized in that it comprises an integral filtering part for connecting system-specific radio-frequency parts to an antenna, the integral filtering part comprising an antenna port for connection to the antenna, at least one port for connection to a first radio-frequency part, at least one port for connection to a second radio-frequency part, and filtering means to direct the propagation of signal between ports on the basis of signal frequency.

The invention is based on that the filter design is given more emphasis in the design of the whole radio apparatus. A radio-frequency filter can be constructed in such a way that it has several signal ports, in which case the propagation of signals at different frequencies from one port to another depends on the internal connections of the filter and on control signals possibly arriving from outside the filter. A single filtering part, which is connected through its ports to the antenna and, on the other hand, to the transmission and reception chains that the mobile phone has for different systems, replaces separate filters and some of the rf switches required by the prior art arrangements. Since the filtering part according to the invention is one constructional whole, the parts inside it need not be limited to 50-ohm interface impedances but the matchings can be optimized so that the need for space, losses and manufacturing costs remain low. The radio-frequency filter, in the prior art, too, is built on a low-loss substrate and inside a shielding metal cover, which factors tend to reduce the susceptibility of the integrated structure to electrical interference and faults.

BRIEF DESCRIPTION OF THE DRAWINGS

The invention is described in more detail with reference to the preferred embodiments disclosed here by way of example and to the accompanying drawings wherein.

DETAILED DESCRIPTION OF THE

Figure 1:
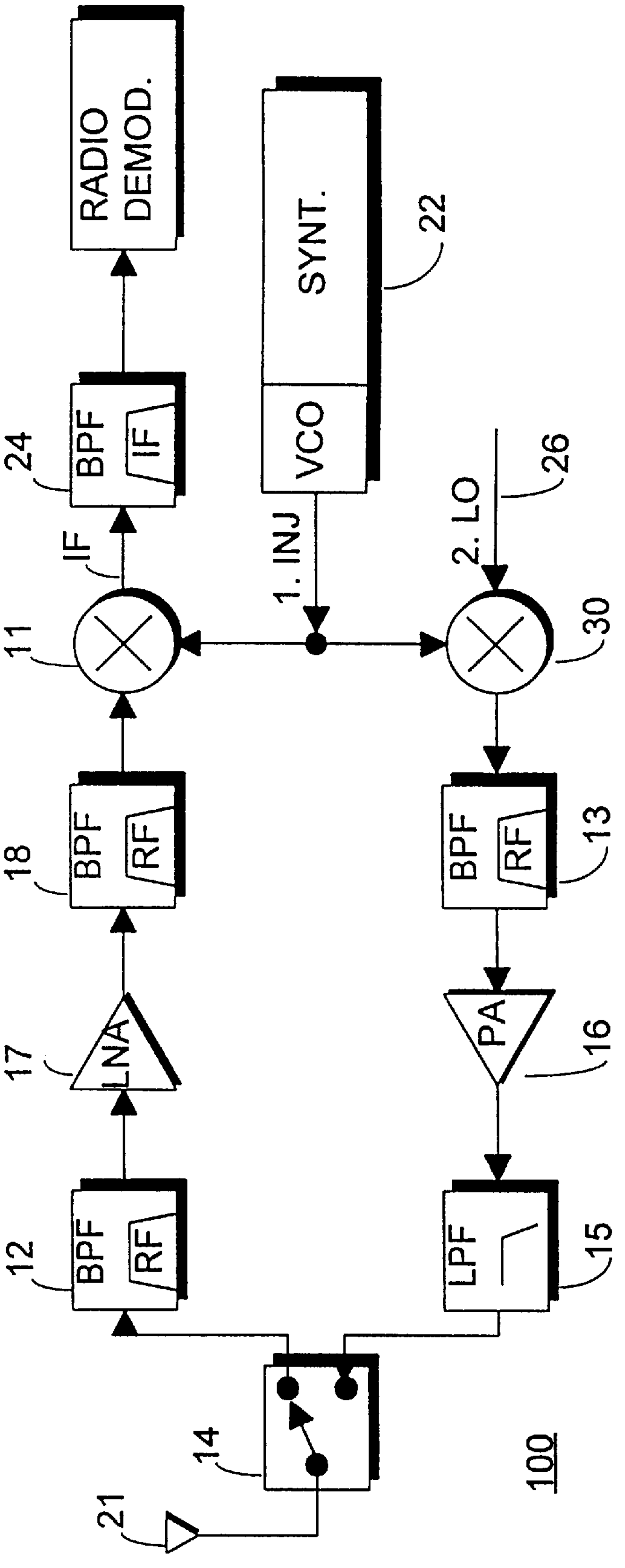
FIG. 1 (Prior Art)
FIG. 1 shows a GSM radio communication device according to the prior art.

Above, in connection with the discussion about the prior art, we referred to FIGS. 1 to 4, so below, in connection with the description of the invention and its preferred embodiments, we will mainly refer to FIGS. 5 to 10. Like elements in the drawings are denoted by like reference designators.

Figure 5:
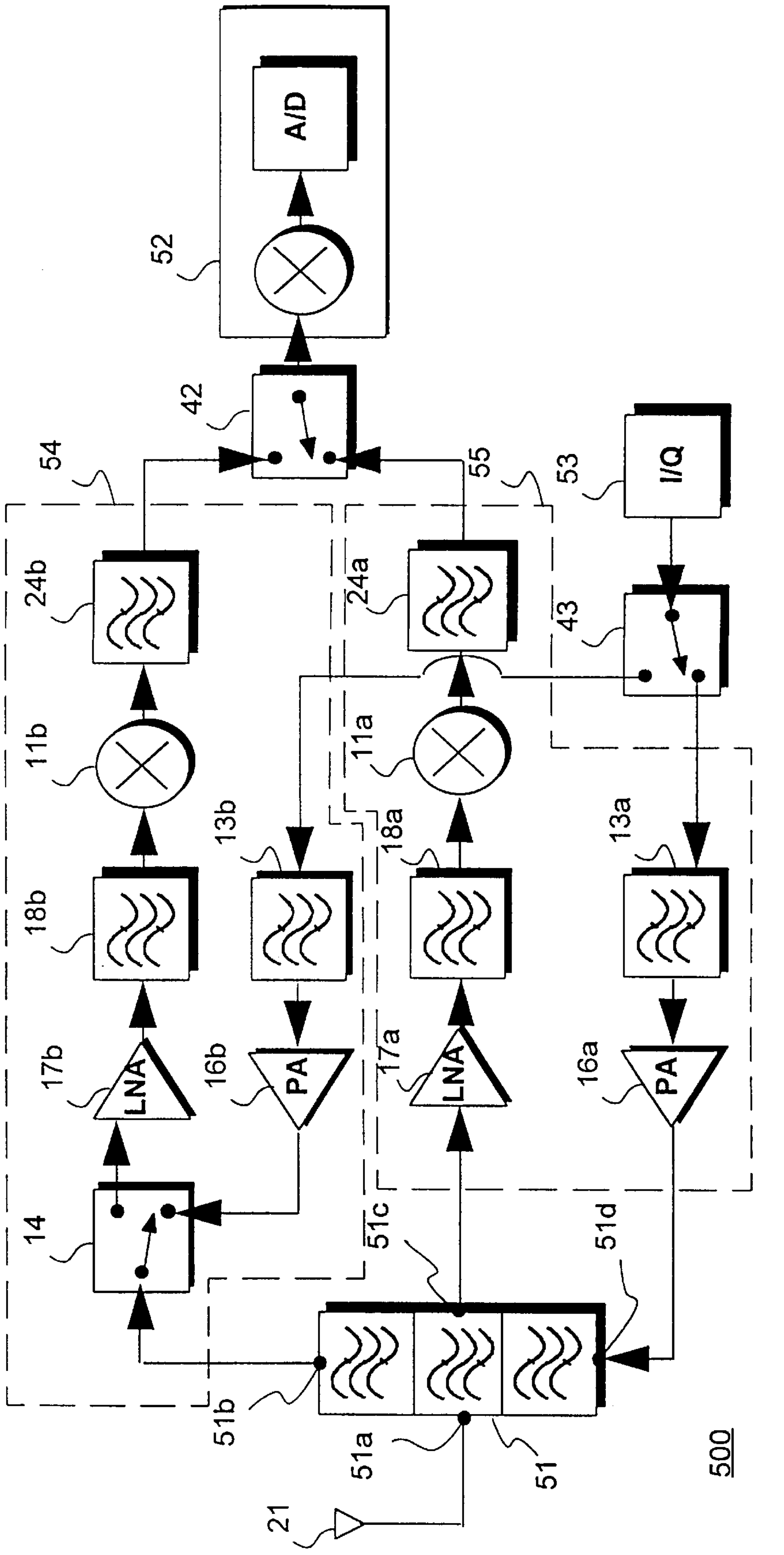
FIG. 5 shows a radio communication device which employs the antenna filtering arrangement according to the invention.

FIG. 5 shows a radio communication device 500 which includes, connected to an antenna 21, a so-called triplex filter 51, or a four-port circuit element, the ports of which in this embodiment are: an antenna port 51*a,* a DECT port 51*b,* a GSM reception port 51*c* and a GSM transmission port 51*d.* The characteristics of a triplex filter depend in a known manner on how many resonators it has, how the resonators are interconnected, what capacitive and inductive elements it includes in addition to the resonators and to which locations in the filter construction the different ports are connected.

Figure 2:
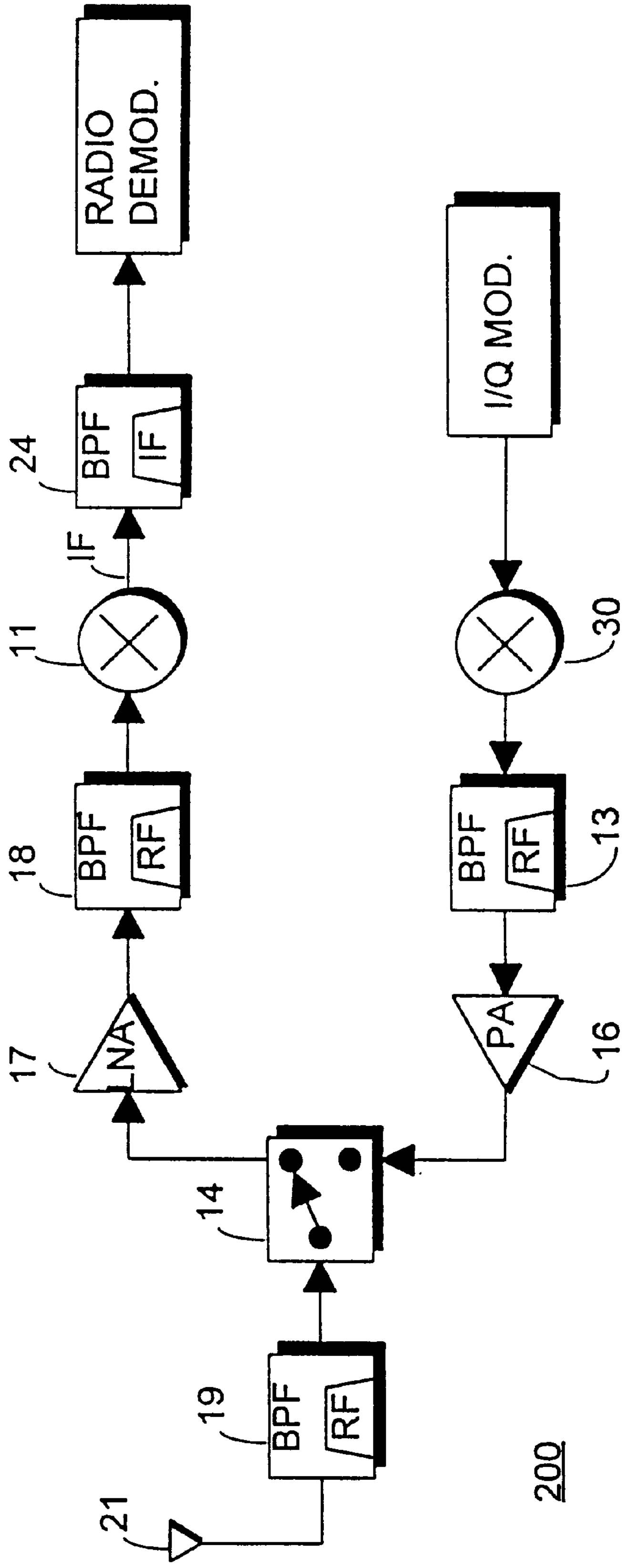
FIG. 2 (Prior Art)
FIG. 2 shows a DECT radio communication device according to the prior art.
Figure 3:
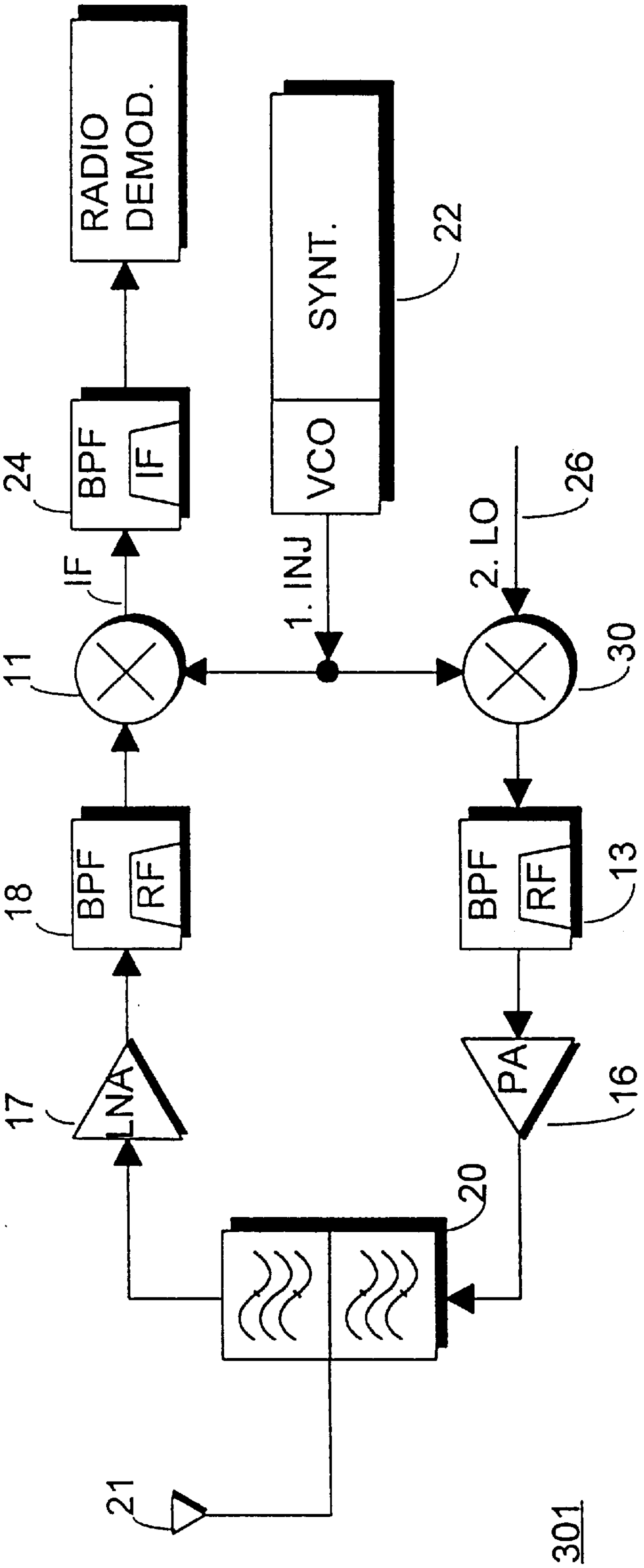
FIG. 3 (Prior Art)
FIG. 3 shows a variation of the device in FIG. 1 according to the prior art.
Figure 4:
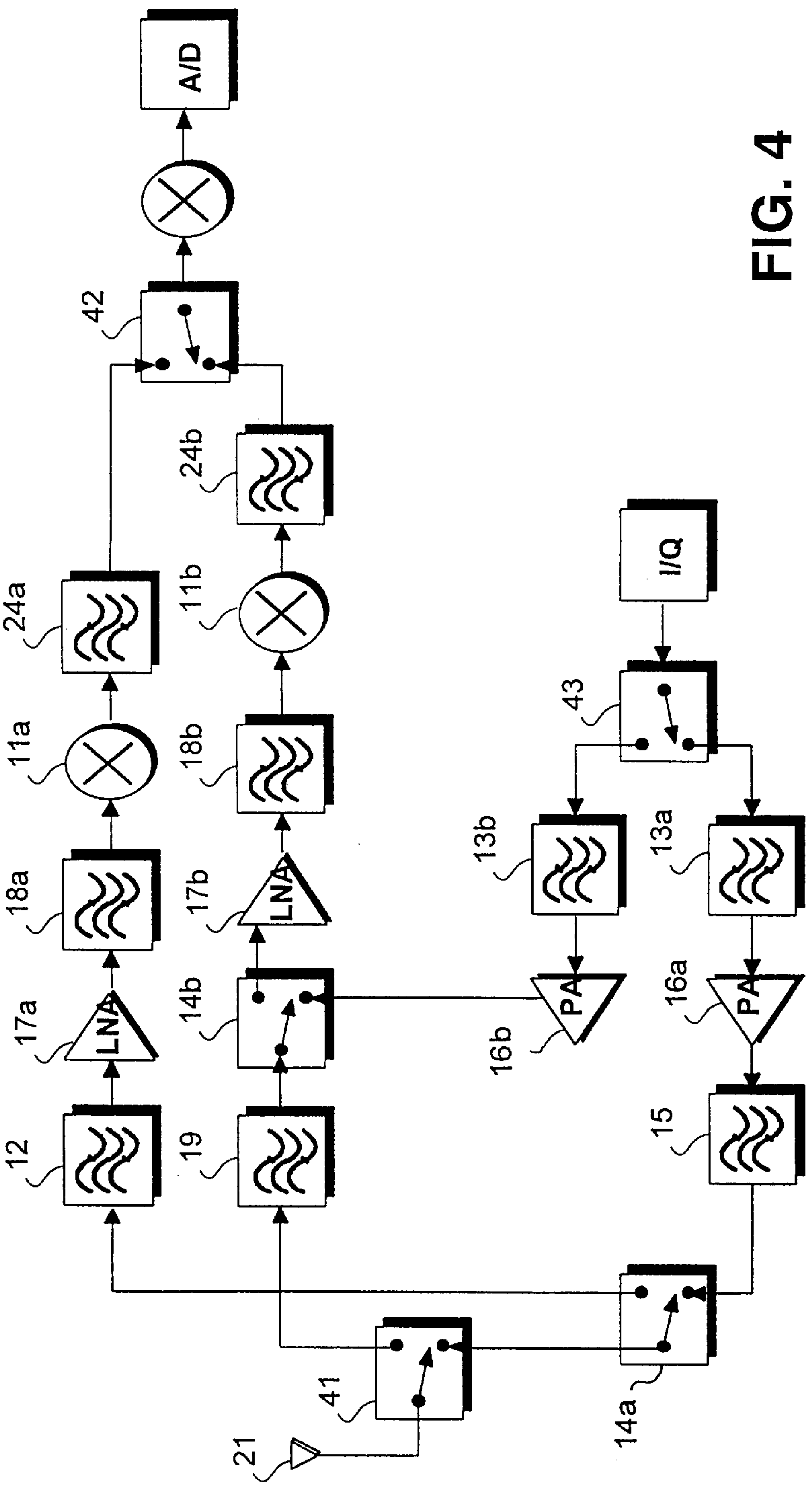
FIG. 4 (Prior Art)
FIG. 4 shows a dual mode radio communication device according to the prior art.

If we consider the transfer function (not shown) of filter 51 between the antenna port 51*a* and the DECT port 51*b* we can see that it behaves essentially like a 1.9-GHz band-pass filter, which in a separate DECT radio communication device is located between the antenna and the antenna switch (cf. reference designator 19 in FIGS. 2 and 4). Between the DECT port 51*b* and the GSM ports 51*c* and 51*d* there is a very high attenuation on a broad frequency band, so the DECT port 51*b* can be said to be separated from the GSM ports 51*c* and 51*d* at all relevant radio frequencies. The transfer functions between antenna port 51*a* and GSM ports 51*c* and 51*d* are substantially the same as in the known duplex filter of the GSM system, denoted by reference designator 20 in FIG. 3. Since the frequency of the DECT system (1.9 GHz) is very far from the frequencies of the GSM system (900 MHz, approx.), the antenna port can be said to be separated from the GSM ports at the DECT frequency and, correspondingly, separated from the DECT port at the GSM frequencies.

The radio communication device 500 according to FIG. 5 comprises a receiver chain according to the DECT system, comprising a low-noise amplifier 17*b,* band-pass filter 18*b,* mixer 11*b* and band-pass filter 24*b,* and a transmitter chain according to the DECT system, comprising a band-pass filter 13*b* and a power amplifier 16*b.* An antenna switch 14 alternately connects the input of amplifier 17*b* and the output of amplifier 16*b* to the DECT port 51*b* of the triplex filter 51. The entity constituted by parts according to the DECT system is denoted by reference designator 54 in FIG. 5.

In addition, the radio communication device comprises a receiver chain according to the GSM system, comprising a low-noise amplifier 17*a,* band-pass filter 18*a,* mixer 11*a* and a band-pass filter 24*a,* and a transmitter chain according to the GSM system, comprising a band-pass filter 13*a* and a power amplifier 16*a.* The input of the low-noise amplifier 17*a* is connected to the GSM receiver port 51*c* of the triplex filter, and the output of the power amplifier 16*a* is connected to the GSM transmitter port 51*d* of the triplex filter. The entity constituted by parts according to the GSM system is denoted by reference designator 55 in FIG. 5. A radio-frequency switch 42 connects either the output of the band-pass filter 24*b* last in the DECT receiver chain or the output of the band-pass filter 24*a* last in the GSM receiver chain to the other reception parts in the radio apparatus, depicted by block 52. A radio-frequency switch 43 connects the signal coming from the modulator 53 of the radio apparatus either to the band-pass filter 13*b* first in the DECT transmitter chain or to the band-pass filter 13*a* first in the GSM transmitter chain.

Figure 6:
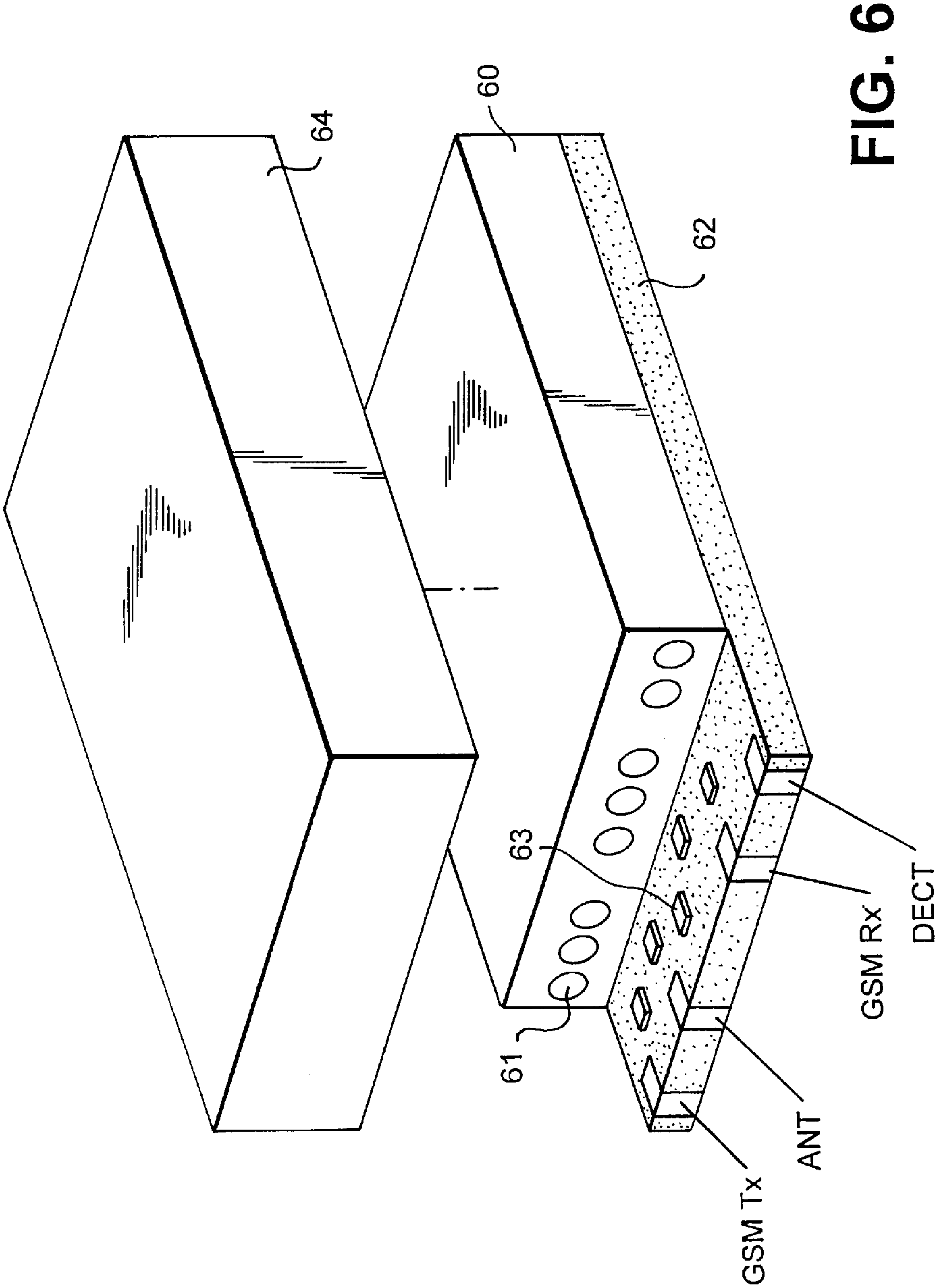
FIG. 6 shows schematically an implementation of the filtering part according to the invention.

The present invention sets no limitations as to the technology used to realize the triplex filter 51. However, considering the relatively high frequencies of the DECT and GSM systems, it is probable that of the known filter technologies the filter construction based on dielectric resonators, as shown in FIG. 6, is the most advantageous one. In that construction, cylindrical holes 61 or grooves or other known resonator forms, coated with an electrically conductive material, are created on a dielectric body block 60 which can be of a ceramic material, for example. Also the greater part of the outer surface of the block is made electrically conductive so that the inner conductors formed by the coating of the resonator forms and the outer conductor formed by the block coating make resonators the electrical lengths of which are a half, a quarter or other applicable part of the frequency in question. According to an advantageous construction, the body block is attached by one of its sides to a low-loss substrate board 62 on the surface of which it is possible to create transmission lines and soldering pads to which separate components 63 are connected. Ports for connecting to the antenna and other parts of the radio apparatus are advantageously strips extending to the edge of the substrate board. It is also possible to create transmission lines and soldering pads (not shown) on the surface of the dielectric body block. A complete construction is covered by an electrically conductive shield 64 which prevents the coupling of electrical interference between the filter and its surroundings.

Figure 7:
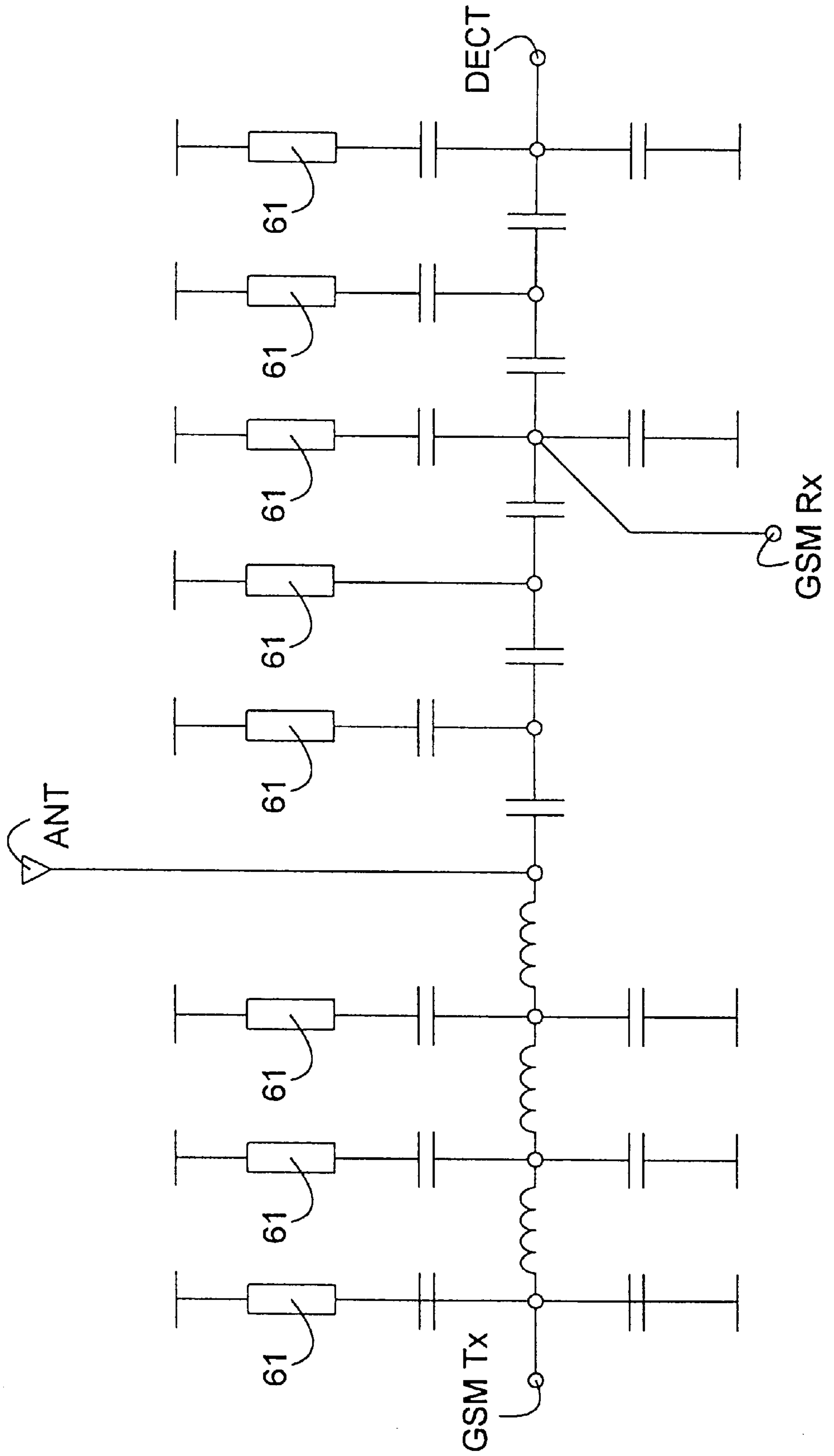
FIG. 7 shows the internal connections of the filtering part shown in FIG. 6.

FIG. 7 shows the internal connections of the filtering part according to FIG. 6. The resonators 61 are coupled at their so-called open end mainly by means of capacitive coupling to a signal line, which between the GSM transmission port GSM Tx and the antenna port ANT comprises inductive parts and between the antenna port and the DECT port DECT, capacitive parts. The GSM reception port GSM Rx is connected to the latter section two resonator stages earlier than the DECT port. The coupling arrangement shown in the drawing is not meant to be of limiting nature but a person skilled in the art, having read this description, can easily provide other filter coupling arrangements that realize the desired triplex function.

Figure 8:
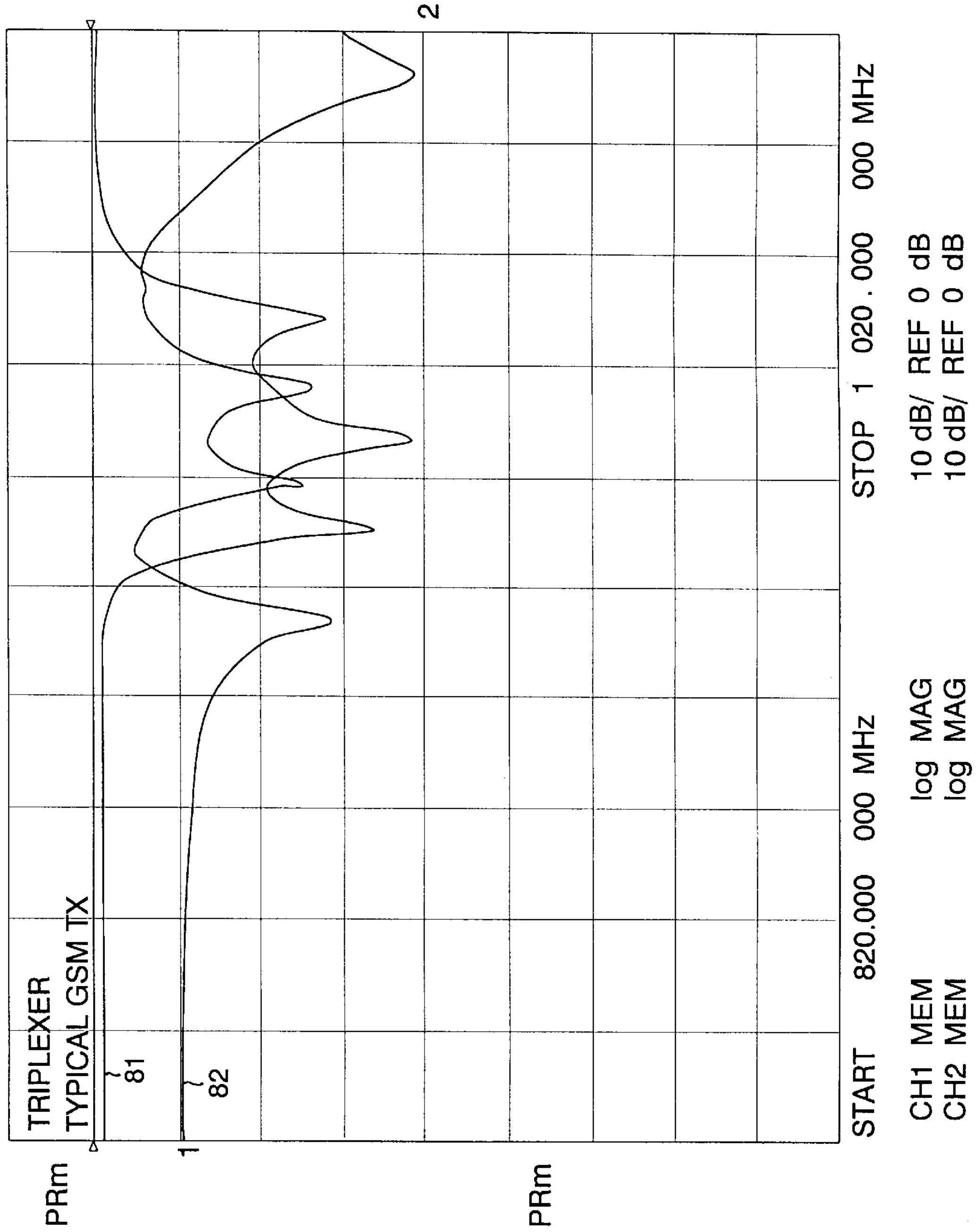
FIG. 8 shows a first frequency response measurement for the filtering part according to the invention.
Figure 9:
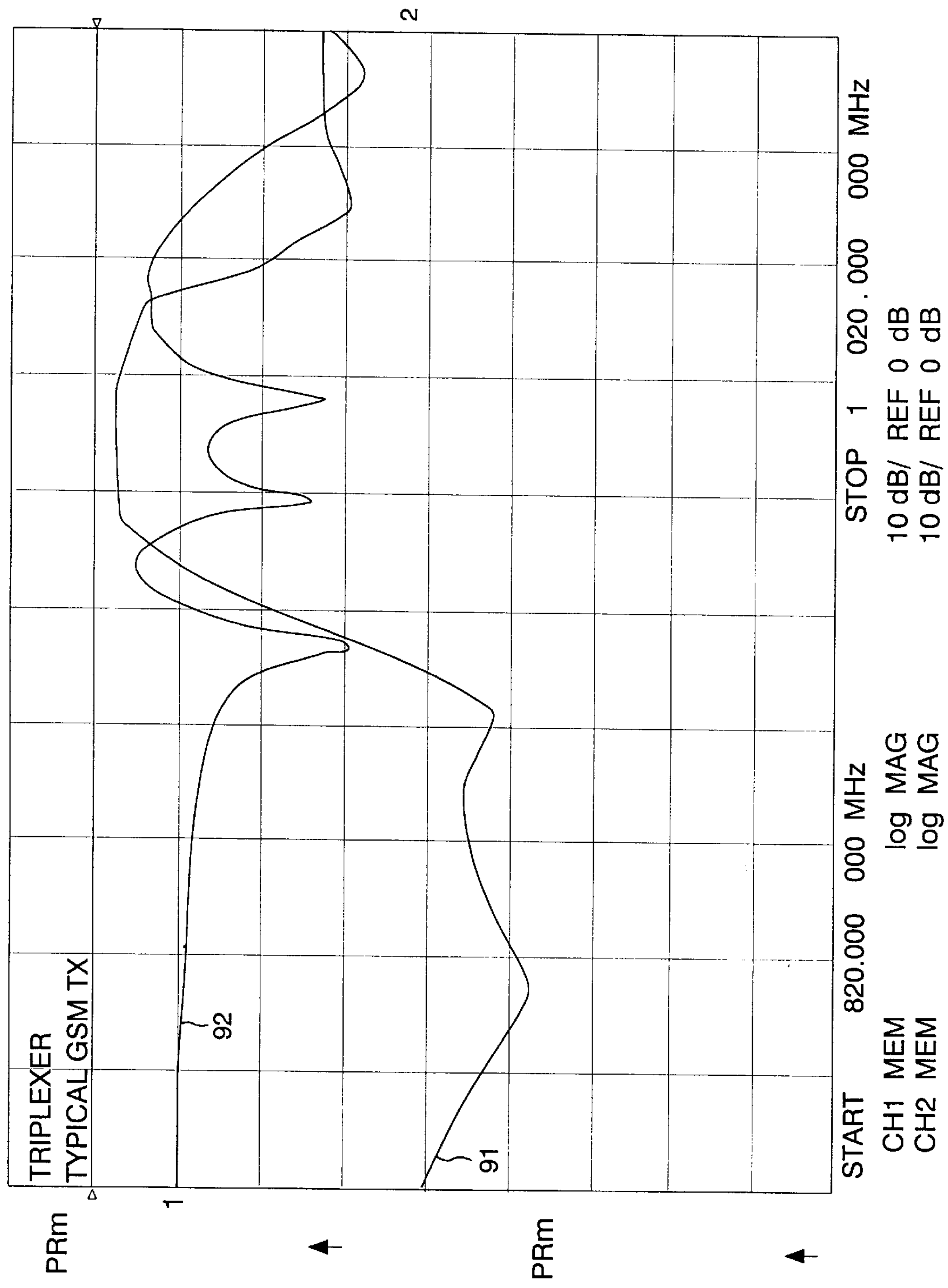
FIG. 9 shows a second frequency response measurement for the filtering part according to the invention.
Figure 10:
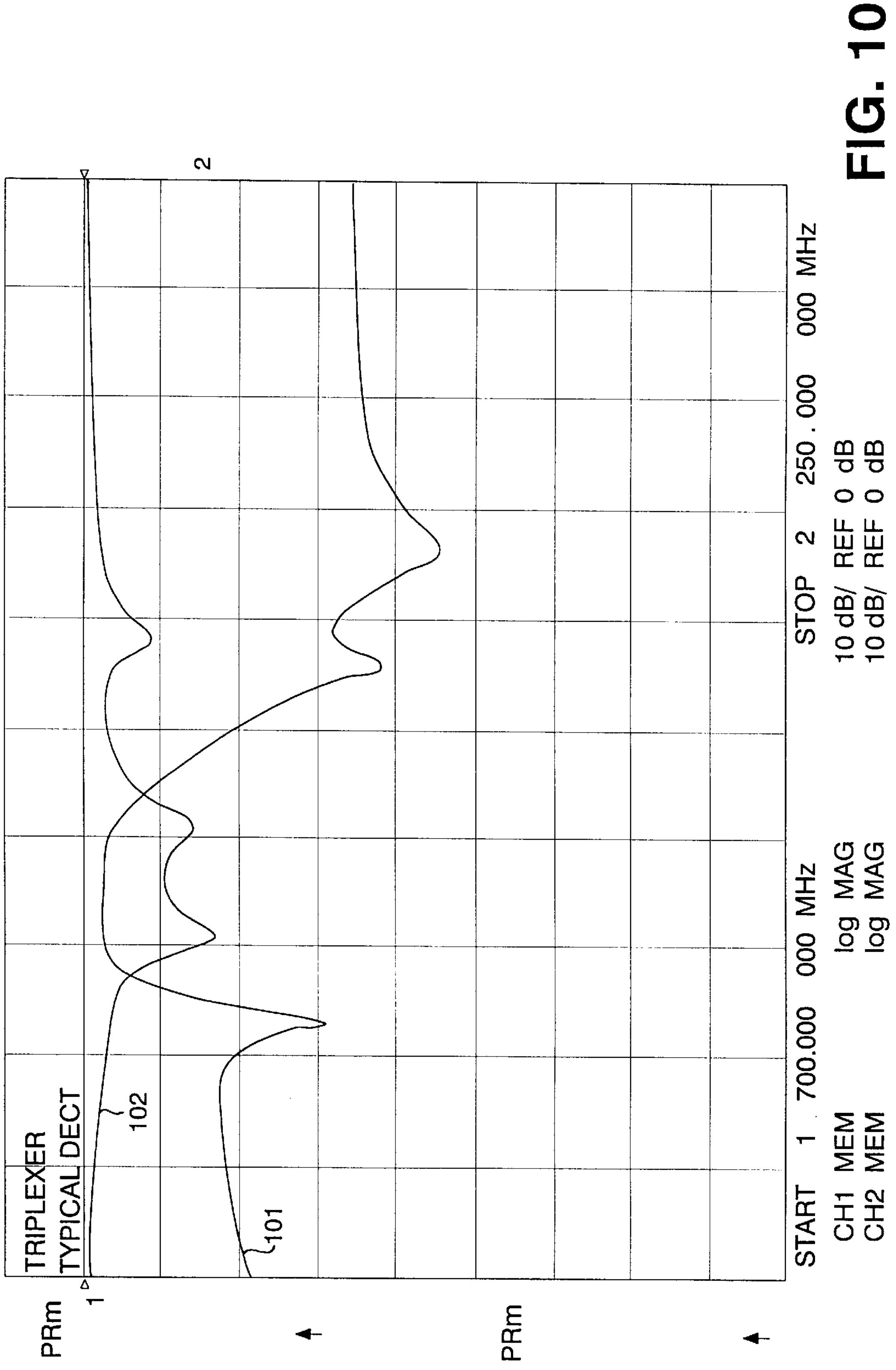
FIG. 10 shows a third frequency response measurement for the filtering part according to the invention.

FIGS. 8 and 9 show measurement results representing the frequency response of the filter depicted in FIG. 7, wherein the horizontal axis represents the frequency in megahertzs starting from 820 MHz and ending at 1020 MHz, and the vertical axis represents the attenuation in decibels so that the horizontal line which has triangles at its ends represents the 0-dB level. Curve 81 in FIG. 8 represents the insertion loss and curve 82 represents the return loss between the antenna port and the GSM transmission port. Curve 91 in FIG. 9 represents the insertion loss and curve 92 represents the return loss between the antenna port and the GSM reception port. In FIG. 10, the scale of the vertical axis is the same as above but on the horizontal axis the frequency starts from 1700 MHz and ends at 2250 MHz. Curve 101 in FIG. 10 represents the insertion loss and curve 102 represents the return loss between the antenna port and the DECT port. FIGS. 8 to 10 show that the integrated filtering part realizes the required filtering functions at each operating frequency, ie. the insertion loss is at its lowest at the desired operating frequency.

Other filtering methods that are suitable for implementing the multi-port filtering part are filters based on helix, strip line or coaxial resonators. In these, too, the construction includes a board-like part made preferably of a low-loss substrate which steadies the structure and serves as an attachment base for separate components and transmission lines. In addition, all filter constructions include an electrically conductive protective casing.

Use of the invention is not limited to the GSM and DECT systems but it can be applied in all dual mode radio apparatuses in which the operating frequencies of the different systems are so much apart that it is possible to arrange, using known filter constructions, a sufficient frequency-based separation in a single filtering part. If the operating frequencies of the systems are the same, the arrangement shown in FIG. 5 is not applicable because there will be no adequate separation between the uppermost port 51*b* of the triplex filter and the other two ports 51*c* and 51*d* on the radio apparatus side. The invention does not restrict the operation of the radio apparatus to two parallel systems but a single radio apparatus can also include three or more parallel radio-frequency parts designed for different systems. If all the parallel systems operate at different frequencies, the arrangement according to the invention can be applied in the antenna filtering.

There are several known arrangements according to the prior art for changing the frequency response of a radio-frequency filter by means of an electrical signal. The multi-port filter according to the invention can be made adjustable. For example, the duplex part (the GSM part in the drawings) of the filter can be replaced by a switchable band-pass filter which at a first value of an electrical control signal passes the transmission band signal but attenuates the signals at the reception frequency, and at a second value of the electrical control signal passes the reception band signal but attenuates the signals at the transmission frequency.

The arrangement according to the invention achieves significant reduction in the need for space in the radio apparatus as the filters, which formerly were separate, are integrated in one assembly having a common protective casing and mechanical attachment. Compared to the prior art arrangement shown in FIG. 4 the invention dispenses with two radio-frequency switches, dropping manufacturing costs and reducing losses. Elimination of separate impedance matching circuits brings more savings in costs, need for space and losses. Especially filters based on dielectric resonators can be mass-produced with a relatively high precision and with a good throughput.

What is claimed is:

1. An antenna filtering arrangement for a dual mode radio apparatus comprising:

a first radio-frequency device for processing radio-frequency signals of a first radio communication system, said first radio-frequency device including a transmitter chain and a receiver chain;

a second radio-frequency device in parallel with said first radio-frequency device, said second radio-frequency device including a transmitter chain and a receiver chain, said second radio-frequency device processing radio-frequency signals of a second radio communication system;

an antenna for transferring radio-frequency signals of said first and second radio communication systems; and an integrated filtering device connecting said first and second radio-frequency devices together, said integrated filtering device comprising:

an antenna port connected to said antenna;

at least one port connected to said first radio-frequency device;

at least one port connected to said second radio-frequency device; and filtering means to direct propagation of signals between said ports based on signal frequency.

2. An antenna filtering arrangement in accordance with claim 1, wherein said integrated filtering part comprises:

a first port connected to said first radio-frequency device;

a second port connected to said second radio-frequency device; and a third port connected to said second radio-frequency device.

3. An antenna filtering arrangement in accordance with claim 2, wherein said filtering means comprises:

a band-pass filter connected between said antenna port and said first port; and a duplex filter connected between said antenna port and said second and third ports.

4. An antenna filtering arrangement in accordance with claim 1, wherein said filtering means comprises at least one transmission line resonator selected from the group consisting of a dielectric resonator, a helix resonator, a strip line resonator, and a coaxial resonator.

5. A radio communication device for transmission and reception of radio-frequency signals of at least two radio communication systems, comprising:

a first radio-frequency device for processing radio-frequency signals of a first radio communication system, said first radio-frequency device including a transmitter chain and a receiver chain;

a second radio-frequency device in parallel with said first radio-frequency device, said second radio-frequency device including a transmitter chain and a receiver chain, said second radio-frequency device processing radio-frequency signals of a second radio communication system;

an antenna for transferring radio-frequency signals of said first and second radio communication systems; and an integrated filtering device connecting said first and second radio-frequency devices together, said integrated filtering device comprising:

an antenna port connected to said antenna;

at least one port connected to said first radio-frequency device;

at least one port connected to said second radio-frequency device; and filtering means to direct propagation of signals between said ports based on signal frequency.

6. A radio communication device in accordance with claim 5, wherein said first radio-frequency device processes radio-frequency signals of a Digital European Cordless Telephone system and said second radio-frequency device process radio-frequency signals of a Global System for Mobile Telecommunications.

* * * * *